US009262282B2

(12) United States Patent
Jain et al.

(10) Patent No.: US 9,262,282 B2
(45) Date of Patent: Feb. 16, 2016

(54) SYSTEM AND METHOD FOR SYNCHORNISATION OF DATA AND RECOVERY OF FAILURES DURING SYNCHRONIZATION BETWEEN TWO SYSTEMS

(71) Applicant: OPSHUB, INC., Palo Alto, CA (US)

(72) Inventors: Sandeep Jain, Palo Alto, CA (US); Prakash Chandra Tiwary, Gurgaon (IN); Aparna Garg, Ahmedabad (IN)

(*) Notice: Subject to any disclaimer, the term of this patent is extended or adjusted under 35 U.S.C. 154(b) by 179 days.

(21) Appl. No.: 14/017,244

(22) Filed: Sep. 3, 2013

(65) Prior Publication Data

US 2014/0068328 A1 Mar. 6, 2014

Related U.S. Application Data

(60) Provisional application No. 61/696,440, filed on Sep. 4, 2012.

(51) Int. Cl.
G06F 11/00 (2006.01)
G06F 11/14 (2006.01)
G06F 11/36 (2006.01)
G06F 11/20 (2006.01)

(52) U.S. Cl.
CPC ........ G06F 11/1471 (2013.01); G06F 11/1443 (2013.01); G06F 11/2079 (2013.01); G06F 11/2082 (2013.01); G06F 11/3676 (2013.01)

(58) Field of Classification Search
USPC ............. 714/15; 707/610, 615, 616, 618, 641
See application file for complete search history.

(56) References Cited

U.S. PATENT DOCUMENTS

| | | | |
|---|---|---|---|
| 7,080,104 B2* | 7/2006 | Ring et al. | |
| 7,111,189 B1* | 9/2006 | Sicola et al. | 714/6.21 |
| 7,143,307 B1* | 11/2006 | Witte et al. | 714/6.23 |
| 7,386,664 B1* | 6/2008 | Roy et al. | 711/114 |
| 7,478,263 B1* | 1/2009 | Kownacki et al. | 714/4.11 |
| 8,156,074 B1* | 4/2012 | Multer et al. | 707/610 |
| 8,818,938 B2* | 8/2014 | Maya et al. | 707/610 |
| 2003/0130984 A1* | 7/2003 | Quinlan et al. | 707/1 |
| 2005/0229035 A1* | 10/2005 | Peleska et al. | 714/12 |
| 2006/0242444 A1* | 10/2006 | Novik et al. | 713/400 |
| 2006/0259517 A1* | 11/2006 | Urscheler et al. | 707/201 |
| 2006/0265434 A1* | 11/2006 | Kathuria et al. | 707/204 |
| 2007/0067584 A1* | 3/2007 | Muto | 711/162 |
| 2007/0130217 A1* | 6/2007 | Linyard et al. | 707/201 |
| 2007/0276983 A1* | 11/2007 | Zohar et al. | 711/100 |
| 2010/0191884 A1* | 7/2010 | Holenstein et al. | 710/200 |
| 2012/0130953 A1* | 5/2012 | Hind et al. | 707/638 |
| 2013/0117482 A1* | 5/2013 | Jain et al. | 710/109 |
| 2014/0032492 A1* | 1/2014 | Ziemann et al. | 707/610 |
| 2015/0082100 A1* | 3/2015 | Jain et al. | 714/48 |

* cited by examiner

Primary Examiner — Kamini Patel

(57) ABSTRACT

The embodiments herein provide a system and method for synchronization of data and recovery of failures during synchronization between two systems. The system for executing synchronization between the source and target systems comprises a connector framework, a process framework, a mapping manager, a recovery manager, a conflict manager and a failure manager. A method for bidirectional data synchronizing and integrating involves keeping information about integration user in integration database for each entity and update along with update time and audit id, only when the system does not keep information about the created and updated entity. A method of synchronizing only the entities qualifying a criterion, a method for failure recovery from a correct point during integration process, a method for handling recovery for changes coming from multiple end points and a method for recovery during server shutdown are also provided.

6 Claims, 8 Drawing Sheets

SYSTEM AND METHOD FOR SYNCHORNISATION OF DATA AND RECOVERY OF FAILURES DURING SYNCHRONIZATION BETWEEN TWO SYSTEMS

CROSS-REFERENCE TO RELATED APPLICATION

This application claims the priority of the U.S. Provisional Patent Application (PPA) with Ser. No. 61/696,440 filed on Sep. 4, 2012 and the contents of which is incorporated in entirety herein.

BACKGROUND

1. Technical Field

The embodiments herein generally relates to a method of synchronizing and integrating data. The embodiments herein particularly relates to a method of synchronizing data between the source and the target systems. The embodiments herein more particularly relates to a system and method for synchronization of data and recovery of failures during synchronization between two systems.

2. Description of the Related Art

A data transferred over a computer bus is synchronized to a bus clock, which ensures that the devices connected to the bus receive a valid data. Moreover, synchronization between the devices includes synchronizing a data used by different applications on the same electronic device.

Hitherto, synchronizing such devices with another device has required an additional acquisition of computer software, usually developed by the manufacturer of one of the devices. Such computer software is relatively clumsy and inefficient. Moreover, the computer software usually places a limitation on the type or format of the data to be synchronized. As a result each device needs its own corresponding synchronization software, each of which needs to be loaded on another device in order to affect a synchronization process.

Hence there is a need for a method for unidirectional and bidirectional synchronization and integration of data between at-least two systems or two instances of same systems and a method for recovering data from a synchronization failure. There is also a need for a method for efficiently handling a recovery of data during synchronization. There is also a need for a method and system for automatically recovering from system and application failures of any type and duration.

The abovementioned shortcomings, disadvantages and problems are addressed herein and which will be understood by reading and studying the following specification.

OBJECT OF THE EMBODIMENTS

The primary object of the embodiments herein is to provide a method for a unidirectional synchronization and integration of data or entity between at-least two systems.

Another object of the embodiments herein is to provide a method for a bidirectional synchronization and integration of data or entity between at-least two systems.

Yet another object of the embodiments herein is to provide a method for synchronizing pre-selected entities qualifying criteria.

Yet another object of the embodiments herein is to provide a method for recovering data from a synchronization failure.

Yet another object of the embodiments herein is to provide a method for handling recovery for changes coming from multiple end points during a synchronization process.

Yet another object of the embodiments herein is to provide a method for recovering from an unexpected server shutdown during a synchronization process.

Yet another object of the embodiments herein is to provide a method for conflict detection between the source and target systems during a synchronization process.

These and other objects and advantages of the embodiments herein will become readily apparent from the following detailed description taken in conjunction with the accompanying drawings.

SUMMARY

The various embodiments herein provide a system and method for synchronization of data and recovery of failures during synchronization between two systems. According to an embodiment herein, a system is provided for synchronization of data and recovery of failures during synchronization between two systems. The system comprises a connector framework comprising a plurality of poller components for reading a data change from a source system and adapter components for writing a data to a destination system. A process framework is provided for processing a poll event. A mapping manager is arranged for mapping a plurality of fields of the source system to a corresponding to a plurality of fields of the destination system. A recovery manager is provided for recovering a data in case of a system failure or any unexpected failure. A conflict manager is arranged for managing all conflict happening during a synchronization process and a failure manager is provided for managing an entire field event during the synchronization process.

According to an embodiment herein, the process framework on successful synchronizing of an event, writes back a data to the source, indicating a successful synchronization process. The process framework passes a data to a failure management component.

According to an embodiment herein, the conflict manager further comprises a master/slave model, and wherein the master/slave model is adopted to master an entity at one system and to create read only copies of a plurality of entities in other development systems and wherein all changes to the plurality of entities are made in a master system.

According to an embodiment herein, the conflict manager further comprises a partitioned ownership model, and wherein the partitioned ownership model is adopted to master a plurality of fields of the entity at a plurality of systems, and wherein the plurality of fields are mutually different, and wherein the plurality of systems are mutually different.

According to an embodiment herein, the conflict manager further comprises a dynamic ownership model, and wherein the dynamic ownership model is adopted to change an ownership of an entity dynamically, and wherein the entity has only one owner at any one time and wherein a current owner of the entity is indicated based on a value of a field in the entity and wherein the current owner is only allowed to pass the ownership to someone else.

According to an embodiment herein, the conflict manager further comprises a peer to peer model, and wherein the peer to peer model is adopted to allow a plurality of sites to make changes to the plurality entities using a conflict detection process and a conflict resolution process.

According to an embodiment herein, the conflict manager further comprises a custom configuration model, and wherein the custom configuration model is adopted to define an actual replication model in a customized manner and mix one or more conflict manager models.

According to an embodiment herein, the failure manager catches the entire failed events during synchronization and creates a failure queue, and wherein the failure manager retries the synchronization process for a preset attempts, when an event fails, and wherein all the failed events are notified and are processed after a manual intervention.

According to an embodiment herein, a method is provided for synchronization of data and recovery of failures during synchronization between two systems. The method comprises steps of polling a right data during a bidirectional integration between a source system and a target system, generating a global unique id associated with each entity, detecting conflicts during a unidirectional synchronization and when a data is moved in one way from a source system to a destination system, detecting conflicts during a unidirectional or bidirectional synchronization and when a data is moved in two ways from the source system to the destination system and vice versa, recovering from a system failure and recovering from an application failure.

According to an embodiment herein, the changes coming originally from the destination system are filtered out. The filtering of the changes coming from the destination system is done on the basis of the user making the changes. The step of polling right data during an integration between the source system and the target system by the user comprises the steps of: synchronizing a new create from the source system to the target system, creating an entry in the target system and saving the created entry information and integration user/manager. The entity is filtered out, when the entity is created/updated by an integration user/manager during a polling of the entity. The integration manager updates the target information in the table.

According to an embodiment herein, the step of generating a global unique id associated with each entity comprises generating global id for each entity based on entity type and a system internal id or few others like Project information by the integration manager, searching an associated global ID in the target system by the integration manager, fetching and writing a target information, when a matching entity is found in the target system based on the generated global ID and the searched associated global ID by the integration manager. A new global id is generated before writing a target information in the target system. This global id is first searched and the global id doesn't exist in integration storage, then the global id information is added to the integration storage. When a matching entity is found in the target system by the integration manager, the target information is updated.

According to an embodiment herein, a conflict occurs when the state of target entity (replicated by integration) is changed without transferring knowledge of the change to source entity. According to an embodiment herein, the step of detecting conflicts in the unidirectional synchronization comprises creating an event (E) with a state (S1) in the source system, and synchronizing the event from the source system to the destination system, and wherein the event (E) is replicated to the destination system with the state (S1). The event (E) is updated in the destination system and the state (S1) is changed to state (S2) after updating. The event (E) in the source system is updated with a state (S3). The states S2 and S3 are generated by non-integration users. The event (E) is synchronized from the source system to the destination system, and wherein the event (E) with state (S3) is written to the destination system. A conflict is detected by identifying a change in the state from (S1) to (S3) for the event (E).

According to an embodiment herein, the step of detecting conflicts in the unidirectional or bidirectional synchronization comprises the steps of creating an event (E) with state (S1) in the source system, and synchronizing the event (E) from the source system to the destination system, and wherein the event (E) is replicated to the destination system with state (S1). The event (E) is updated in the destination system and the state is changed from (S1) changed to (S2). The event (E) is updated in the source system with a state (S3). The event (E) is synchronized from the destination system to the source system, with the event (E) with state (S2). A conflict is detected by identifying a change in the state (S3) for the event (E) by integration. Then the event (E) is synchronized with state (S3) from the source system to the destination system and a conflict is detected by identifying change in state (S2) for event (E) by the integration.

According to an embodiment herein, applying the changes sometimes requires multiple steps or invocations of destination system Application Programming Interface (API)'s/calls and a failure happens in the middle of the set of calls so that some changes have been executed and other changes have not been executed. Then the step of recovering from the system failures comprises the steps of storing a time stamp of the source system and a step id that are last processed for each entity by the integration system for handling failures. The synchronization is resumed from an exact point of failure and an updating of further events is allowed, when the time is greater than or equal to the time of source system and when a step id of the event is greater than 1.

According to an embodiment herein, the step of recovering from the application failures comprises the steps of sending the event by the source system pollers and assigning a constant step number to each sub step in an update process. A last updated time value is received or gotten from the target system for the entity that is updated. The integration storage is updated with the event and a respective last storage time. The changes done by the integration user after a last storage time is checked for the event along with a time of changes, before initiating an update. The time of changes in the integration storage is updated, when the changes are found and the entity in the integration storage is created/updated, when the changes are not found.

The various embodiments herein provide a system and method for synchronization of data and recovery of failures during synchronization between two systems. Once an entity is synchronized to the target, integration of data starts and after that, a synchronizing of all updates from a source entity to a correct entity in a target is completed. The method keeps a track on which a source entity is linked to a destination entity to avoid any mistake which results in a data corruption on a client side. There are several ways to keep this track. One is to store a one-one relation between a source entity and a target entity in a separate data table. This results into large data set as entities will increase. As for each source system, the target entity is linked to a store. For example: a source system entity, E1 of type T1 is associated to entity E5 in a target of type T2. Similarly for other way round.

According to one embodiment herein, a method for keeping a track on which the source entity is linked to a destination entity comprises assigning a unique global ID to that entity and later on searching only for that global ID under target system. This eliminates a use of maintaining a separate store to keep the linkages data and also reduces a data size. So once an entry is created in a target, the entry is added for that target entity in a data store so that the added entry is retrieved next time for updating. For example, when an entity E1 is created in a source, a unique ID, say G1, is generated and an entry will be made in an integration store for E1, source system ID and G1. When it is synchronised to a target system afterwards, one more entry is made with same unique ID i.e. G1. If say E5 is created in a target, then an entry will look like E5, destination system ID and G1.

According to one embodiment herein, an ID generation algorithm is adopted for generating a global ID. The algorithm ensures that the unique ID is generated each time for an entity. For example, a system name_entityid is used as a unique identifier or even entity type and scope ID is also used for generating a unique ID depending on the attributes in a system which makes it unique.

According to one embodiment herein, an incremental approach is adopted for generating a global ID. The incremental approach comprises starting from 1 and keeps on adding +1 to it. This reduces the work of identifying the unique attributes for a system and this approach doesn't increase a column size too. For example, when E1 is fetched from a source system and if its entry is not added in the integration store, then a new ID is generated by doing max (global id)+1. Since the integration store is common and the integration store is tracked for at any given point of time, only one entity is used for generating global ID and saving the generated global ID in the integration store. For example, two integrations are configured from system x to system y and one for system y to system z. Now in system x and system y, some entity E1 is created, and pollers of both the system will come and generate new ID for E1. If the synchronization is not monitored, then it may happen that E1 from both the systems gets same global ID.

According to one embodiment herein, for avoiding more than two systems from getting the same global ID, the global ID generating and saving steps are clubbed in one block and also ensured that at a time only one entity is being processed in this block.

According to one embodiment herein, a method for bidirectional synchronizing and integrating data between at-least two systems is provided. Consider a bidirectional synchronizing process in which the changes are the result of synchronization. Wherein a processing of these changes will cause a cycle of changes between the two systems resulting in a never ending process. To avoid this, some information is maintained in a system to track whether the change was done through a user interface or through a system plug-in API with a reserved synchronization user. This requires a way in each third party system where user audit information is not available; we need to maintain such a flag. For achieving this, the flag is read/write using some reserved user and ensures that no changes are done through this user via user interface. While polling, all the changes done by this reserved user is excluded.

According to one embodiment herein, when newly created or updated information is not stored in the system and the changes are to be filtered, one custom field is created in an end system and username of an integration user is stored in that particular field for filtering the changes.

According to one embodiment herein, the method of filtering the changes comprises storing an information about the integration user in the integration database for each create done by the system under creation by an attribute for each entity and an update time or audit ID is stored in the integration store for each update. For example, when there is a bidirectional integration between system x and system y, and whenever any create is synced from system x to system y, an entry is made for an entity created in system y with integration user. When the system y polls same entity, the same entity is filtered out as the same entity is created by same integration user which is used to poll changes. For Example, say E1 is created in system x, an integration will fetch it and assign global ID to it say G1 and create entity say E1 in system y with global ID G1 and created by the set to user U1 (integration user). Now when system y poller is run, the poller reads that E1 is created, but E1 is not synced back to system x as it is created by the user U1. For the updated entity, it is not sufficient to just store it as it is updated by. For maintaining the context for each entity, the changes done by the integration user is tracked and stored for audit IDs. So, there is a 1-n relation for each entity, wherein there can be many context entries for each single or one entity. For maintaining an update, consider the following approach: for each update coming from system x to system y on entity E1, after the updating of E1 in y, the context entry with audit ID of the last change is added along with an integration user. Consider an example in which an Entity is E1, a system is y, an audit ID (say) is A1 and integration user is U1. Now let's say entity in system Y has fetched three audit IDs for E1, namely A1, A2, A3. Of these three audit IDs, only two are synced to system x with respect to entity context of E1, as the audit A1 is done by an integration user.

According to one embodiment herein, the method for synchronizing pre-selected entities which qualifies the criteria is provided. One of the key aspects in any integration is a data which is desired by the user and which is to be synchronized. For syncing a particular data, a query is sent for those entities which qualify the criteria and sync the particular data qualifing the criteria to the target system. Consider a case in which, the criteria are F1=1, which says that only those entities, having 1 in field F1, are synced. At the time of first poll, entity E1 has F1=1 and hence synced to target. Afterwards, E1 is updated to F1=2, so that any change to the entity will not be synced to target in the next time. When we sync entities which satisfy criteria at polling time, it won't work. In order to overcome this problem, a flag is attached/marked to the entity and then all entities with flag-on condition are synced.

According to one embodiment herein, the method for marking the entities comprises, storing IDs of all the entities in the application database and syncing only those entities who's ID exists in the application database. Once entry is made in the database, it won't get removed and new entities meeting criteria will be added to the store at every polling. For example, when an user configures the abovementioned criteria F1=1 and polling time to t1, the poller will search, in a source system, for all entities created/updated after t1, where F1=1 and the entry is saved in the database with entity ID and sync=true. Once criteria entry is saved into the database, the poller will move ahead and get all entities created or updated after time t1. But only those entities with an entry for sync=true in the context field are synced. The rest of the creates or updates are skipped. This process eliminates the need for creating a custom field.

According to one embodiment herein, a method for recovering from a synchronization failure is provided. Whenever two systems are being integrated, it is expected for some sync to fail as result of some wrong data in some field which makes it invalid in the target or some other issue. It is very important for integration to start doing changes from exact point at which it failed. For example for each update coming from system x to system y, three step update is done in the system y. Now, for a given event, if step 1 is done but some error occurred at step 2, then next time when the event comes for retrial, execution must begin from step 2 rather than 1. In order to ensure this or achieve this, the time of source system and the step ID that we last processed is stored for each entity synced. So, when we have stored the time of processing and last step Id for entity E1 in store so that last processing was done for time t1 and the last step ID is step 1 for entity E1, then next time only those events on E1 will be entertained, whose time is >t1 or time is equal to t1 but step ID is greater than 1.

According to one embodiment herein, the method for handling a recovery for changes coming from multiple end points during synchronization is provided. Consider the scenarios where system x is integrated to system y and system z is also integrated to system y. There is an entity E1 synced to all three systems. Now say E1 was updated at time t1 in system x and at time t2 in system z. Where t1<t2. Sync from system x failed because of some invalid data error. While update from system z is successfully synced. Now when we retry to update event from system x, it will be shown that no update is required as E1 in system y is already at t2 and t1<t2. Here we need to take an extra step and store time for each integration rather than entity wise. So, the time is tracked for system x and system y separately and the time is tracked separately for system y and system z. After tracking the times separately for the set of systems x and y, and y and z, we can retry the update event again. When an update event from system z at time t2 is written to system y, a corresponding entry such that entity E1 was last processed for time t2 and the step ID is step 1 and the same is stored for system z and system y, it is to be noted that the last processing time for E1 is t0 for E1 for system x and system y, and we have updated only for system z. Now when an update event from system x is received again, a re-try process is done again to update it since, for system x, time is still at t0 and update is remaining.

According to one embodiment herein, the method for recovering from unexpected integration application server shutdown or network, hardware, or any kind of unexpected failure (where there is no clear indication (or recording) of whether a particular step was done) is provided. It is easy to track for changes or failures, when the system is up and some expected error has occurred. But when the server crashes unexpectedly and integration has no idea about the event state or synchronization phase till where it was executed. Consider the case, in which the server crashes just after the create is done in target and before saving the same in integration store. Now, when the entity is polled for next time, the integration store has no idea or data about its creation and will create it again. To avoid this, before any create or update, the last time, at which the target system is updated (let's call it M1), is retrieved and saved in the integration store against the source entity which is in process currently. When any create or event for which execution stopped unexpectedly is received in future, the target system is queried to get any entity which is created after M1 by the integration user and does not have a corresponding entry in the integration store. When there is any such entity present in the integration store, then no create is done and the target entity reference is just stored in the database or else a target entity reference is created and stored. For example, an entity E1 is created in system x, which is synced to system y and created there but the server crashes before adding an entry for E1 for system y. As a result, the entity E1 is already synced to system y from a user point of view but integration is not yet confirmed and it is not sure about what was done and what is left. To prevent creating a duplicate entity in system y, the following method is defined; when E1 is started to sync to system y for a first time, the last time (t1), at which any create or update was done in system y, is collected or retrieved before creating the entity in system y. let us assume that the last time at which the update was done is t1. Then the time t1 is saved against E1 for system x. When the server crashes down afterwards and restarts, the E1 is started or retried to sync again, and the integration system/module finds that entity's sync state is not known and query system y to get entities created after maximum time that we stored in database. i.e. t1 and created by integration user in an order of time. Integration module receives E1 at time t2 from system y and store it with same global ID that is carried by E1 from system x.

According to one embodiment herein, a similar scenario is provided for update process also, where an update has been made in destination but integration is not provided with any track of the update. It is to be ensured that update is not written twice by checking status of the previous create/update as it may be possible that some other user has done some changes in that entity. For update process also, the same step or process is started. i.e., the maximum time is collected from the destination system and whenever any entities comes, whose sync state is not known, integration queries the destination system to get all updates done on the entity that will be updated in the destination and done by the integration user after maximum time. For example E1 is updated in system x. Now when sync is started, first max time from system y is collected and saved in the database. For example, the max. time is t2 and is saved against E1 for system x. The E1 is updated at time t3 in system y and server crashes and comes back after some time. Now update on E1 from system x is polled again but before updating the system y is queried to find if there is any update on E1 after time t2 by integration user. When it is found that one (1) update is done at t3 and hence no update is done.

According to one embodiment herein, a method for conflict detection between systems during synchronization is provided. For system storing audit information, it is easy to detect conflict by comparing an old state of source entity with a current state of target entity. The audit logs are used to recreate the appropriate state as needed. When the source system does not save as of state condition, in this case the track of state is stored in the integration database. When the system x does not save history, and whenever any read or write is done in system x, the current state of that entity is recorded in integration store as old state and next time when any update happens on same entity, current state is retrieved from the system itself and old state is retrieved from integration store. But this is not sufficient. For example, when the entity E1 is synced from x to y and y to x, E1 is updated in x and some error occurred while syncing to y and it is logged in a failure queue. Now E1 is updated in system y. when E1 is polled from y, the old state retrieved from the integration store does not match with the current state in x and as a result, a conflict is detected. Now even though the failed event from x to y is processed, other event from y to x is never processed as the other event carries a wrong old state with it. A solution for this problem is to maintain one flag for each entity, for example, "processing in progress" and whenever some update on entity is done by any system, the flag, "processing in progress" is marked true for that entity. So the processor, before starting processing, checks to find that whether any processing is being carried out or not. The processing is continued only when there is no processing under progress. Or else log the process is logged in a failure queue and a next event is started.

According to one embodiment herein, the step of fetching the old state for the failed event is done every time they are being processed. Consider the case in which the old state is fetched only for first time while the update is done and the processing in progress is no longer set and the old state is not yet been updated in integration store, then poller of system y continue processing E1 and fail as result of conflict. This occurs always. Hence it will always fail. Hence it's necessary to fetch old state for failed event every time they are being processed.

According to one embodiment herein, the method for saving old state in database is provided. The method comprises serializing the old state object into xml and saving the xml string into the database for reading object back and it can be de serialized again into object. Serializing to XML is highly efficient and is easily understood by other platforms. Additional benefit is that when there is a need for something to be corrected in saved serialized data, and then it is easily done when it is in XML rather than any other language specific format.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
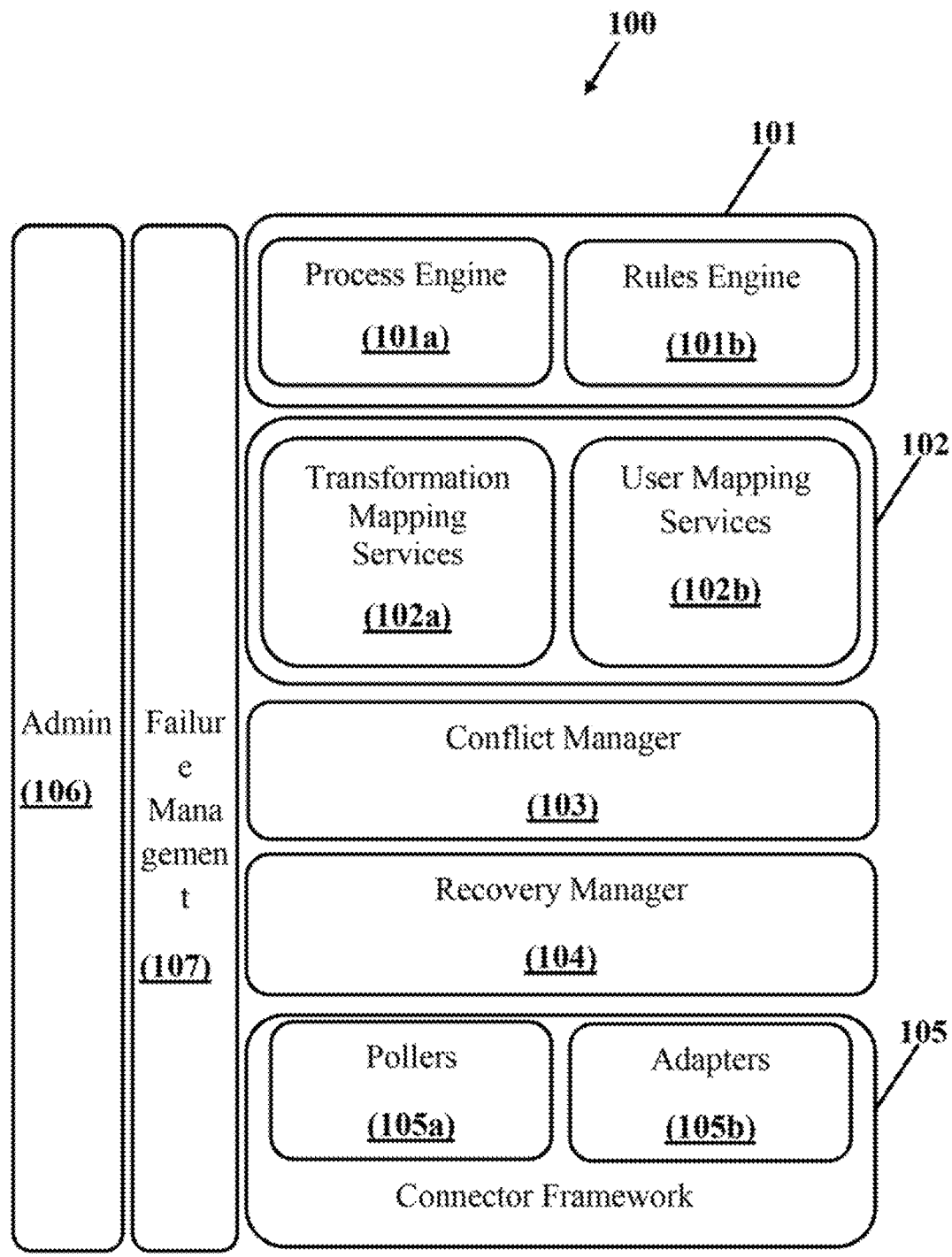
FIG. 1 illustrates a block diagram of a system for executing synchronization between the source and the target systems, according to an embodiment herein.

FIG. 1 illustrates a block diagram of a system for executing synchronization between the source and the target systems, according to an embodiment herein. The system 100 for executing synchronization between the source and the target systems comprise a connector framework 105, a process framework 101, a mapping manager 102, a recovery manager 104, a conflict manager 103, a failure manager 107 and an admin module 106. The connector framework 105 further comprises poller components 105a and adapter components 105b. The poller components 105a are responsible for reading the data changes from the source systems. The adapter components 105b are responsible for writing the data to the destination systems. The process framework 101 is responsible for processing the poll event. The process framework 101 further comprises one or more process engine 101a and one or more rules engine 101b such as but not limited to JBOSS, JPDL, Drools, Apache ODE, etc. All the components in the synchronization system are loosely coupled, and hence processing engines 101a are switched easily. Further, the process framework 101 on successful synchronizing event, writes back to the source stating or indicating success and on failure, the process framework 101 passes to failure management component.

According to one embodiment herein, the mapping manager 102 further comprises transformation mapping services 102a and user mapping services 102b for mapping different fields of source system to corresponding field of target systems. The synchronization system uses XSLT for mapping files.

According to one embodiment herein, the recovery manager 104 is an inbuilt component in the synchronization system. In case of system failure or any unexpected failures, the recovery manager 104 automatically recovers the data. The recovery manager 104 leverages both adapter components 105b and poller components 105a.

According to one embodiment herein, the conflict manager 103 manages all the conflicts occurring during the synchronization. A conflict occurs, when integration finds that the current value of any field of destination does not match with last value of source field. The conflict manager 103 of the synchronization system detects conflict and also provides one or more integration models to resolve the conflict automatically.

According to one embodiment herein, the conflict manager 103 comprises a master/slave model, a partitioned ownership model, a dynamic ownership model, a peer to peer model and a custom configuration model. In the master/slave model, the entity is mastered at one system and read only copies of those entities are created in other development systems. All changes to the entities are made in the master system. In the partitioned ownership model, different fields of the entity are mastered at different systems. In the dynamic ownership model, the entity ownership changes dynamically, but at any one time there is only one owner. The current owner is indicated based on the value of a field in the entity. Only the current owner is allowed to pass the ownership to someone else. In the peer to peer model, multiple sites are allowed to make changes to the entities and it typically requires a conflict detection and a conflict resolution. In the custom configuration model, the actual replication model is custom defined and typically some mix of the one or more conflict manager models.

According to one embodiment herein, the failure manager 107 manages the entire failed event during synchronization. The failed events are those which failed to write to destination system. The synchronization system of the present invention catches those events and creates a failure queue. When an event fails, the failure manager 107 retry by itself up to certain attempt. The entire failed events are notified and are processed after human intervention through the admin module 106.

Figure 2:
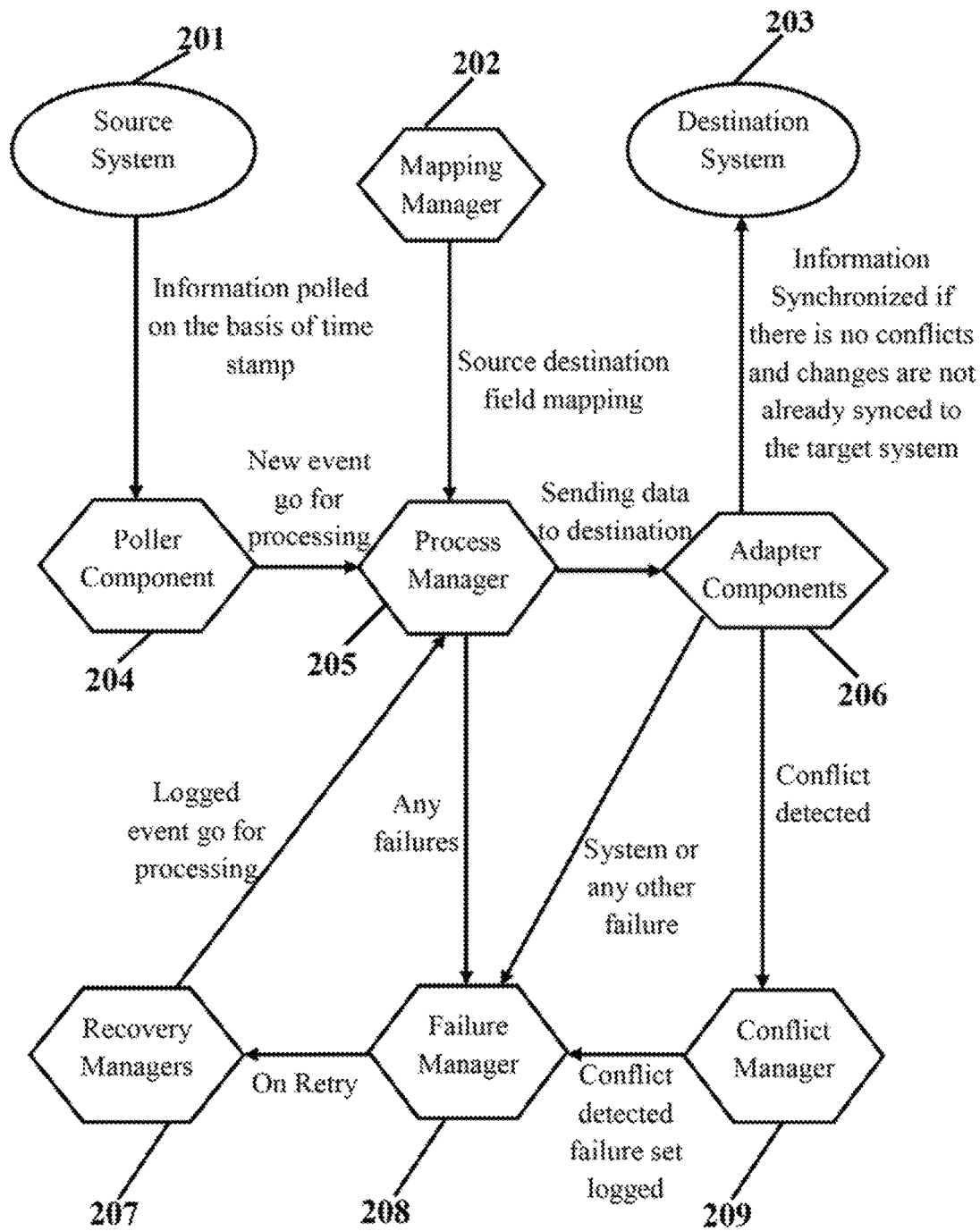
FIG. 2 illustrates a functional block diagram of a system for executing synchronization between the source and the target systems, according to an embodiment herein.

FIG. 2 illustrates a functional block diagram of a system for executing synchronization between the source and the target systems, according to an embodiment herein. With respect to FIG. 2 the poller component 204 polls the information from the source system 201 on the basis of a time stamp. The process manager 205 receives the polled information for processing. The mapping manager 202 carries out the source destination field mapping for the event or information and redirects to the process manager 205. The process manager 205 checks for any failures. If any failure is detected, the process manager 205 redirects the detected failures to the failure manager 208. Then the failure manager 208 redirects the received failures to recovery manager 207 to recover the failures. The recover manager 207 recovers the failures and sends the recovery to the process manager 205. The process manager 205 sends the processed information to the destination system 203 through adapter components 206. When the adapter components 206 detect any conflicts, then the event or information is redirected to the conflict manager 209. The conflict manager 209 detects the conflict and redirects to the failure manager 208 to resolve the conflict. The information or event is synched to the destination system 203 by the adapter components 206, if there is no conflicts and changes are not already synced to the destination system 203.

Figure 3:
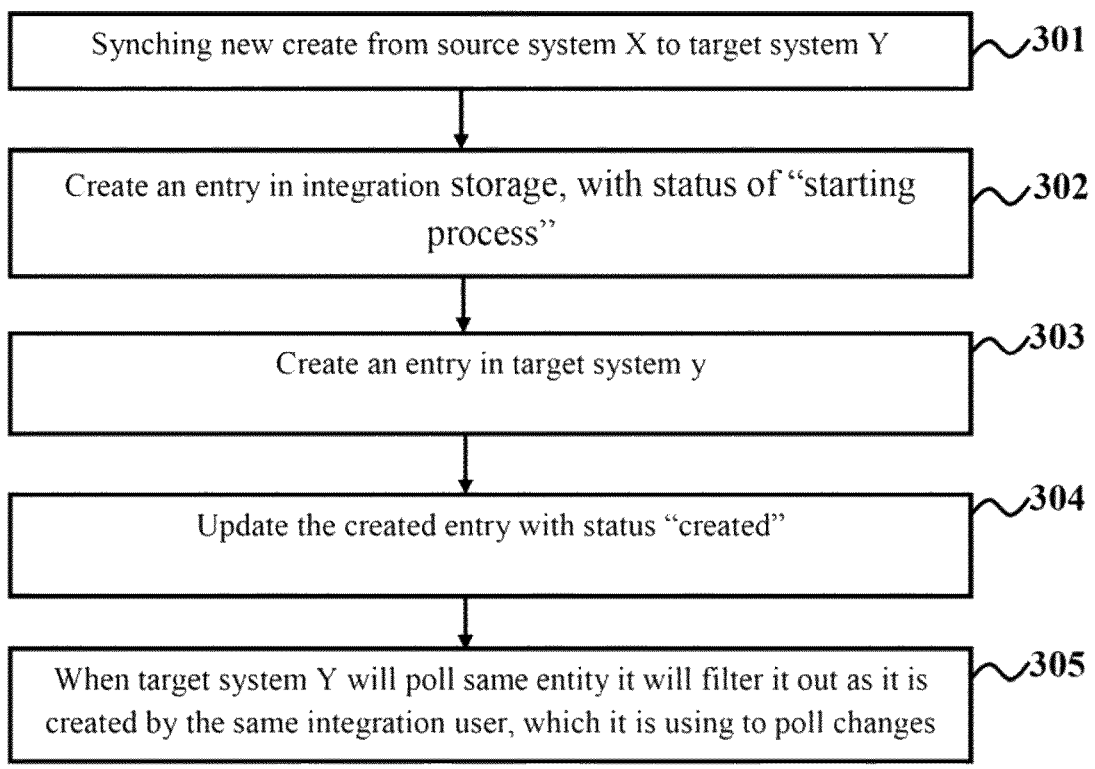
FIG. 3 illustrates a flowchart indicating a method for polling right data during bidirectional integration between a source system and a target system, according to an embodiment herein.

FIG. 3 illustrates a flowchart indicating a method for polling a right data during bidirectional integration between a source system and a target system, according to an embodiment herein. The method for polling the right data during bidirectional integration between a source system and a target system is provided. For every create done by a system adapter, an information about an integration user is maintained in an integration database under created by an attribute for each entity and for each update an update time or audit id is saved in an integration store. Hence, there is bidirectional integration between the source system and the target system. The method for polling the right data during bidirectional integration between a source system and a target system comprises the steps of synchronizing a new create from source system X to target system Y (Step 301). An entry is created in the integration storage, with status of "starting process" (Step 302). The entry is created in the target system y (Step 303). The created entry is updated with status "created" (step 304) and when target system Y will poll same entity it filter it out as it is created by the same integration user, which it is using to poll changes (305). For example: (say) E1 is created in the source system x, integration will fetch E1 and assign global id say G1 and create entity say E1 in target system y with global id G1. The entry creation is saved to user U1 (integration user). Now, when the target system y poller is run, it will read that E1 is created but it won't get synced back to source system x as it is created by user U1 (integration user).

According to an embodiment herein, a context is maintained for each entity. The audit id's of the changes done by the integration user is tracked and stored in the context. For each entity, there are 1-n relations, wherein there can be many context entries for each entity. For each update coming from source system x to target system y on entity E1, after updating E1 in y, a context entry is added with the audit id of last change and integration user against it. For example:—Entity is E1, target system is y, audit id say A1 and integration user U1. Consider a scenario wherein entity Y has fetched three audits for E1 i.e. A1, A2, A3. Of these three only two will be synced to the source system x, since entity context of E1 i.e. audit A1 is done by the integration user U1.

Figure 4:
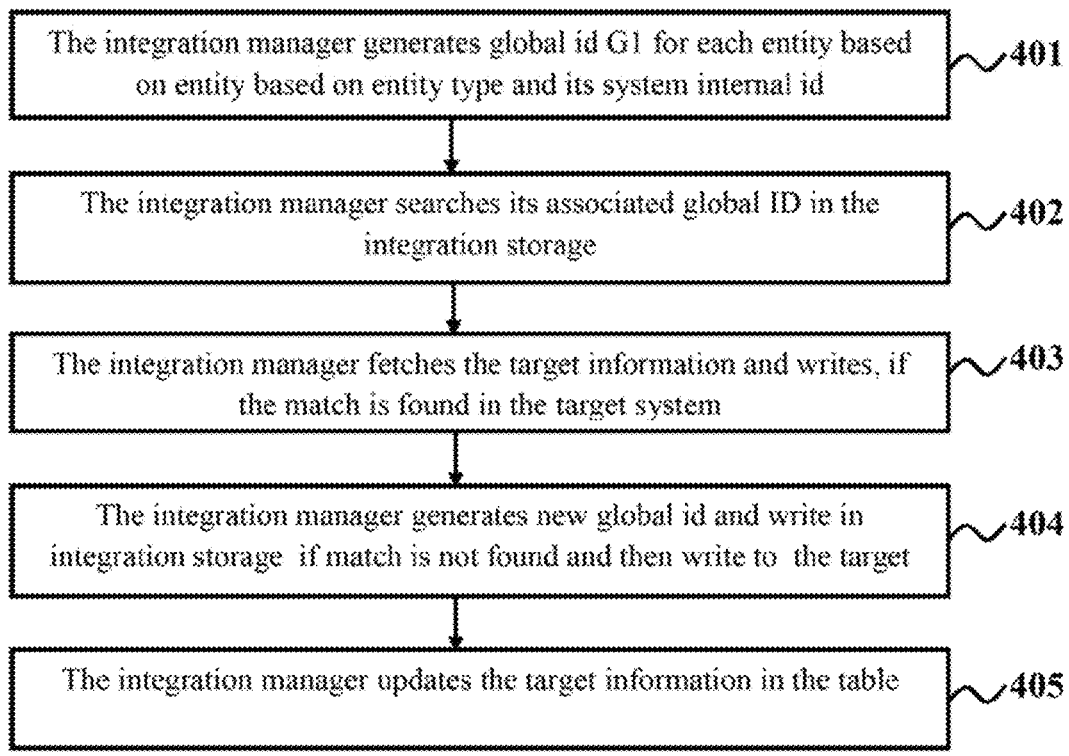
FIG. 4 illustrates a flowchart indicating a method for generating a global unique id associated with each entity and two entities in two different systems, according to an embodiment herein.

FIG. 4 illustrates a flowchart indicating a method for generating a global unique id associated with each entity and two entities in two different systems, according to an embodiment herein. For each synced entity, a unique id is generated and maintained. Before writing an entity into target system, an associated unique id is searched. If the unique id is found, then the entity is updated into target system. If not, then a new entity id is generated in target system.

According to an embodiment herein, a system name_entity id is adopted as a unique identifier for generating a unique id. Further, an entity type and a scope id are appended too depending on attributes in system, which makes it unique.

According to an embodiment herein, the integration manager of the present invention incrementally generates unique id based on integration, entity and its type and associate with the sync. This does not require working out the unique attributes for a system and it will not increase the column size. When E1 is fetched from source system and if its entry is not there in the integration store, then a new id is generated by doing max (global id)+1. Since integration store is a common store to all the integrations, at any given point of time, only one entity is allowed to use the integration store for generating global id and save the global id in the integration store.

According to an embodiment herein, the integration manager maintains a global unique id which is associated with each entity and the two entities in two different systems but representing the same data have a same global ID. The integration carries out all the searches, on the basis of the global ID only. There forth all entities from any system having same global ID is considered as same entity laying in different systems.

According to an embodiment herein, for changing poll from the system, the integration manager generates global id G1 for each entity based on entity type and its system internal id (Step 401). The integration manager searches its associated global ID in the integration storage (Step 402). The integration manager fetches the target information and writes, when the match is found in the target system (Step 403). The integration manager generates new global id and written in the integration storage, when the match is not found in the target system (Step 404) and the integration manager updates the target information in the table (Step 405).

Figure 5:
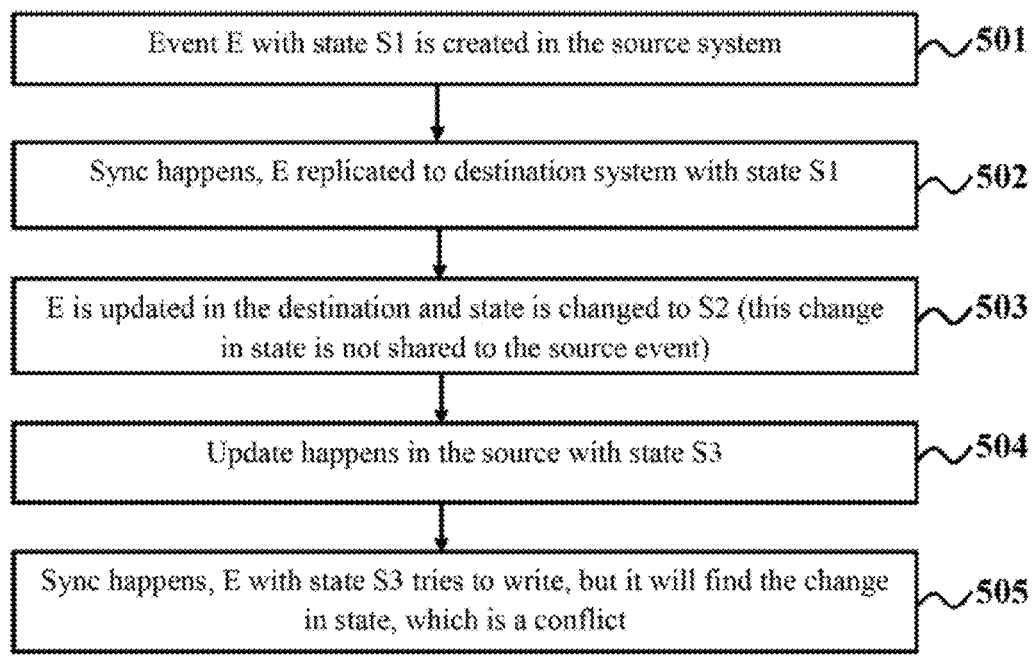
FIG. 5 illustrates a flowchart, indicating a method for conflict detection unidirectional sync i.e. when data flows in one way from source to destination system, according to an embodiment herein.

FIG. 5 illustrates a flowchart indicating a method for conflict detection for unidirectional sync i.e. when data flows in one way from source to destination system, according to an embodiment herein. The conflict detection determines which operations are to be made by one replica without transferring knowledge of the change to the other replica, for example, when two replicas make local updates to the same item. The conflict occurs when the state of target entity (replicated by integration) is being changed without transferring the knowledge of the change to the source entity. With respect to FIG. 5, conflict detection for unidirectional sync i.e. when data flowing in one way from source to destination system comprises the steps of:

Event E with state S1 is created in the source system (501),
Sync happens, E replicated to destination system with state S1 (502),
E is updated in the destination and state is changed to S2 (this change in state is not shared to the source event) (503),
Update happens in the source with state S3 (504), and
Sync happens, E with state S3 tries to write, but it will find the change in state, which is a conflict (505).

Figure 6:
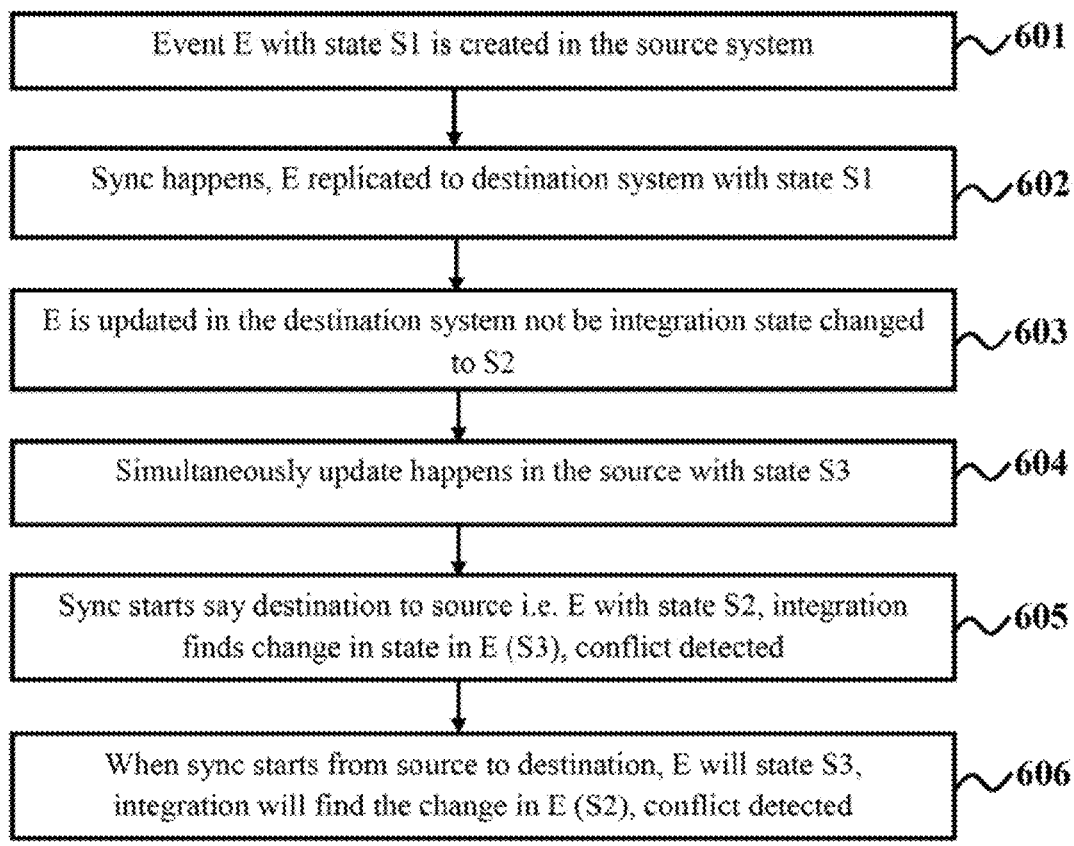
FIG. 6 illustrates a flowchart indicating a method for conflict detection for bidirectional sync i.e. when data flows in two ways between the source and destination systems or a data flows from the source system to destination system and vice versa, according to an embodiment herein.

FIG. 6 illustrates as flowchart indicating a method for conflict detection for bidirectional sync i.e. two ways of data flow from source to destination system and vice versa, according to an embodiment herein. With respect to FIG. 6, conflict detection for bidirectional sync i.e two ways of data flows from source to destination system and vice versa comprises the steps of:

Event E with state S1 is created in the source system (601),

Sync happens; E is replicated to the destination with state S1 (602),

E is updated in the destination system, not be integration, state changed to S2 (603), Simultaneously update happens in the source with state S3 (604), Sync starts, say destination to source i.e. E with state S2, integration finds change in state in E (S3), conflict detected (605), and When sync starts from source to destination, E with state S3, integration will find the change in E (S2), conflict detected (606).

According to an embodiment herein, the conflict detection is based on the entity audit (time based). For example, the conflict detection method of the present invention defines current state of entity as existing state; old value of entity is the state just before the existing state. For example: Consider an entity E with following audit (t1<t2<t3):

At time t1: State S1 (just created): Current State=S1, Old State=null

At time t2: State S2 (some updates bring to S2): Current State=S2, Old State=S1, and At time t3: State S3 (some updates bring to S3): Current State=S3, Old State=S2.

According to an embodiment herein, the current state of the source and the new state of the source are same for the source system.

According to an embodiment herein, the conflict occurs in the integration, when old state of the source entity is not same as the current state of the entity at destination system.

According to an embodiment herein, for system storing audit information, the conflict is detected by comparing the old state of the source entity with the current state of the target entity.

According to an embodiment herein, a conflict occurs in integration when old state of source entity is not same as current state of entity at destination. According to an embodiment herein, the conflict detection method keeps track of the state of the entity in integration database by recording the history of changes in the state of the entity. The recording of history provides a failure proof process to enable a recovery of failure from a process automatically, when a failure occurs during the recording process of history. When a history recording is also failure in the sense that, if the failure occurs during this process, then the failure is automatically recovered and an indication of the failure is also recorded. For example:—if system x does not save history, so whenever any read or write is done in system x, the current state of that entity is recorded in the integration store as old state and next time when any update happens on the same entity, current state is retrieved from the system itself and old state is retrieved from the integration store.

Consider a scenario where the entity E1 is synced from x to y and y to x. E1 was updated in the x and while syncing to y some error occurred and it is logged in failure queue. Now E1 is updated in system y. Here if the polling starts for E1 from y, then conflict is detected since the method receives old state that does not match with the current state in x. Now even though the failed event from x to y is processed, other event from y to x is never getting processed as it carries wrong old state with it. Hence, one flag for each entity, say processing in process, is maintained to avoid carrying wrong old state. Similarly, whenever any system carries out some update on the entity, processing in progress is marked true for that entity. So the processor before starting processing checks that whether any processing is under progress or not. If not, then only the update processing is continued or else processor logs it in failure queue and starts with the next event.

According to an embodiment herein, the conflict detection method fetches old state for failed event every time they are being processed. Consider a scenario in which the old state for failed event is fetched only for the first time while the update is done and the update processing in progress is no longer set but the old state is not yet updated in integration store. Then the system y poller continues processing E1 and fails as result of conflict and always fails. Hence, the conflict detection method fetches old state for failed event every time they are being processed.

According to an embodiment herein, the algorithm for handling conflicts comprises the steps of:

```
sending the event E by the source system pollers,
event E comes with Old State (O) and New state (N),
setting flag In_processing <-false,
if (!in_processing) then
    in_processing==true,
    getting the current state (C) of the replicated entity in the target
    (either from the target or from the integration storage),
    if (O=C) update in the target,
        in_processing==false
    else
        log for conflict
in case of any error <- log to failure queue
else
log in failure queue.
```

Figure 7:
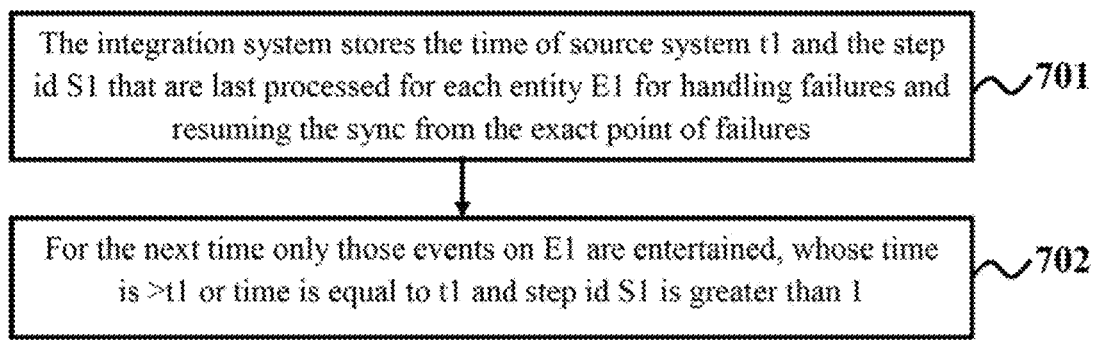
FIG. 7 illustrates a flowchart indicating a method for recovering from system failures during synchronization of data between the source and destination systems, according to an embodiment herein.

FIG. 7 illustrates a flowchart indicating a method for recovering from system failures, according to an embodiment herein. The failures in the integration are categorized as expected failures and non-expected failures. The expected failure comprises a data failure defined as failure caused due to incompatible data or bad data. The non-expected failures comprises a system failure defined as failure due to unavailability of end systems during integration and integration application failure defined as failure due to unavailability of integration server or some internal error of the application.

According to an embodiment herein, the integration system of the present invention comprises an automatic recovery process for handling all kind of failures and resuming the sync from the exact point of failures.

According to an embodiment herein, the integration system of the present invention handles system failures and resumes the sync from the exact point of failures, in case a complete transaction is failed. The integration system keeps track of last transaction for handling system failures. The last transaction is tracked with the last updated event and its time.

According to an embodiment herein, the integration system of the present invention handles failures and resumes the sync from the exact point of failures, in case a transaction comprises several sub transactions. The integration system starts doing changes from the exact point at which it is failed. For example:—For each update coming from source system x to target system y, 3 steps update is done in target system y. If step 1 is done, but system failure occurs at step 2, then next time when event comes for retrial, the execution begins from the step 2 rather than step 1.

According to an embodiment herein, the integration system keeps a track on the time of source system and step id that are last processed for each entity for handling failures and resuming the sync from the exact point of failures. The integration system stores the time of source system t1 and the step id s1 that are last processed for each entity E1 (701). For the next time only those events on E1 are entertained, whose time is >t1 or time is equal to t1 and step id s1 is greater than 1 (702). For example:—the algorithm for keeping track of the last transaction by updating (Event, Step1d) based on stepId comprises:

---
Step 1: Source time ← entity source E, creation time, t1
Step 2: Step Id ←0
Step 3: Entity_found =Check for entity in integration system with time t1
Step 4: If (Entity_found= = true)
    StepId = Check for StepId in integration system for E1
    Update (E1, StepId)
Step 5: Else
Update (E1, 0)

---

Figure 8:
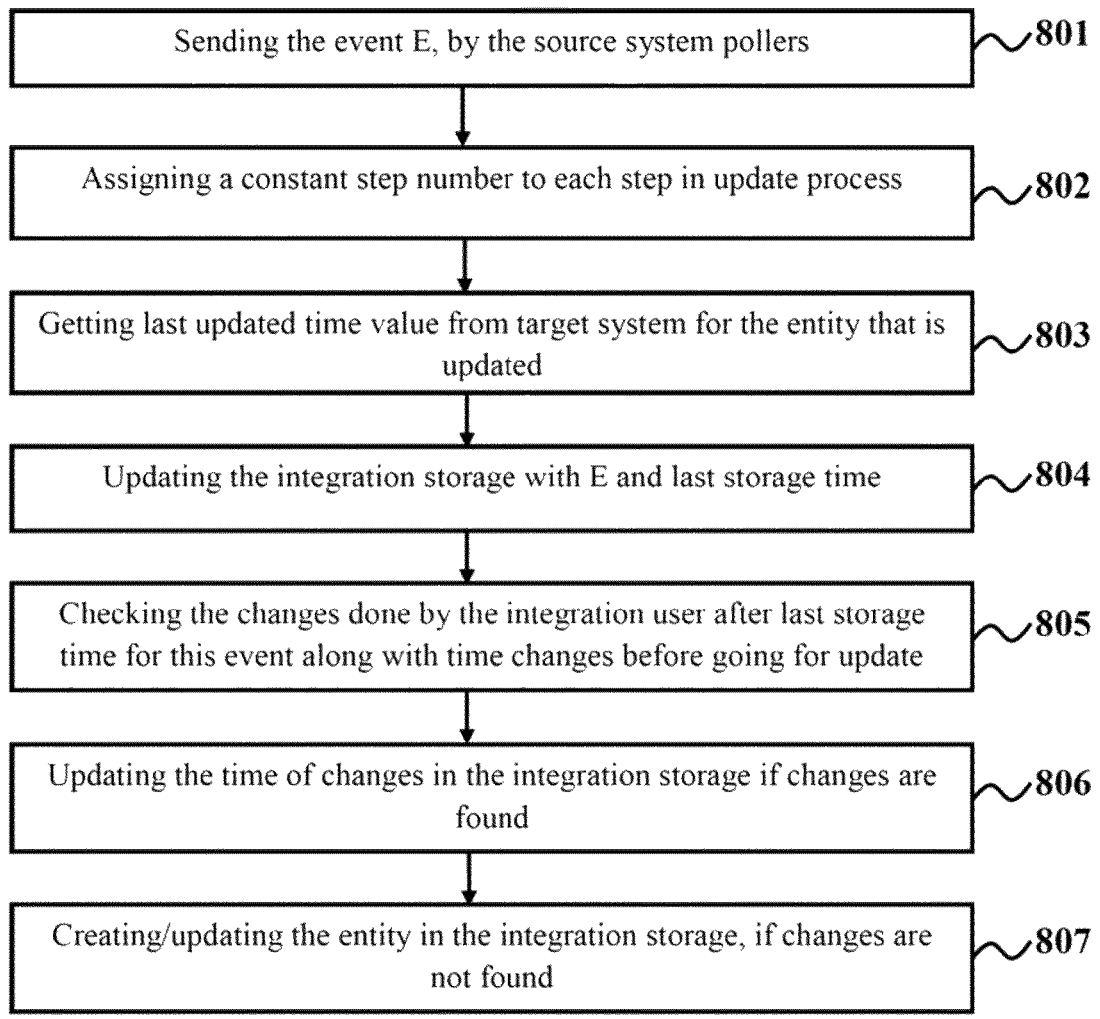
FIG. 8 illustrates a flowchart indicating a method for recovering from application failures during synchronization of data between the source and destination systems, according to an embodiment herein.

FIG. 8 illustrates a flowchart indicating a method for recovering from application failures, according to an embodiment herein. The method for handling application failures by the integration system is provided. According to the method, before any create or update event, the details of the last time at which the target system (i.e. M1) is updated, is collected, and the collected time and create or update event are stored in the integration store against the source entity, which is in process currently. So next time, when any create event is received for which execution stopped unexpectedly, then a query is sent to the target system for not having entry in the integration store and to get any entity created after M1 by the integration user. When an entity is found in the integration store, then no create is done and the target entity reference is stored in database. When the entity is not found in the integration store, then create is done and stored in the database. For example:—consider a scenario where if entity E1 is created in the source system x which is synced to the target system y and wherein entity E1 is created in the source system x and if server crashes before an entry is added for E1 in the target system y. Now entity E1 is already to be synced to the target system y, but integration is not yet sure about what was done and what is left. To prevent creating duplicate entity in the target system y, the steps are followed: when first time entity E1 comes to sync to the target system y, before creating, last time in system y at which any create or update was done is found. If t1 is found, then is t1 saved against E1 for system x and when afterwards server crash down and restart E1 comes again to sync, integration will see that entity's sync state is not known and will query system y to get entities created after maximum time that is stored in the database i.e. t1, created by integration user in order of time. Integration will get E1 at time t2 from system y and will store it with same global id that E1 from system x is carrying.

According to an embodiment herein, the method for handling application failures is provided, when an update has been made in destination but integration is having no track on the same. The integration system tracks and verifies that update is not written twice as it may be possible that some other user has done some changes in that entity. For updating, the method comprises: getting maximum time from the destination system and whenever any entities comes, whose sync state is not known, integration queries destination system to get all the updates done on entity that will be updated in the destination and all the updates done by the integration user after maximum time. For example:—E1 is updated in the system x. When sync begins first, the integration system receives max time from the system y and saves it in the database. Consider a scenario if t2 is received and it is saved against E1 for system x. E1 is updated at time t3 in system y and server crashes and comes back after some time. Now update on E1 from system x will be polled again but before updating, a query is sent to the system y to check if there is any update on E1 after time t2 by the integration user. If update is found which is done at t3, then no update is done to the E1. The algorithm for handling application failures comprises the steps of:

sending the event E, by the source system pollers (801),
assigning a constant step number to each sub step in update process (802),
getting last updated time value from target system for the entity that is updated (803),
updating the integration storage with E and last storage time (804),
checking the changes done by the integration user after last storage time for this event along with time of changes, before going for update (805),
updating the time of changes in the integration storage, if changes are found (806), and
creating/updating the entity in the integration storage, if changes are not found (807).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method for synchronization of data and recovery of failures during a bidirectional synchronization between two systems, the method comprises the steps of:

polling a right data during a bidirectional integration between a source system and a target system;
synchronizing a new create from the source system to the target system;
creating an entry in the target system, wherein an entity is filtered out when the entity is created by a same integration user during a polling of the entity;
saving the created entry to the integration user;
generating a unique global id associated with each entity;
detecting conflicts during the bidirectional synchronization and when a data is moved in one way from the source system to the target system;
generating the global ID for each entity based entity type and a system internal id by the integration manager;
searching an associated global ID in the target system by the integration manager;

fetching and writing a target information, when a matching entity is found in the target system based on generated global ID and the searched associated global ID by the integration manager;
generating a new global id and storing the generated global ID in an integration storage, when a matching entity is not found in the target system by the integration manager; and
updating the target information in a table by the integration manager;
detecting conflicts during a bidirectional synchronization and when a data is moved in two ways from the source system to the target system and vice versa;
recovering from a system failure: and
recovering from an application failure.

2. The method of claim 1, wherein the method further comprises the step of detecting conflicts in the unidirectional synchronization, said method comprising the following steps:
creating an event (E) with a state (S1) in the source system,
synchronizing the event from the source system to the target system, and wherein the event (E) is replicated to the target system with the state (S1);
updating the event (E) in the target system and changing the state (S1) to state (S2) after updating;
updating the event (E) in the source system with a state (S3);
synchronizing the event (E) from the source system to the target system,
and wherein the event with (S3) is written to the target system; and
Detecting a conflict by identifying a change in the state from (S1) to (S3) for the event (E).

3. The method of claim 2, wherein the step of detecting conflicts in the unidirectional synchronization comprises the steps of:
creating an event (E) with state (S1) in the source system;
synchronizing the event (E) from the source system to the target system, and wherein the event (f) is replicated to the target system with state (S1);
updating the event (E) in the target system and changing the state from (S1) changed to (S2):
updating the event (E) in the source system with a state (S3);
synchronizing the event (E) from the target system to the source system with the event (E) with state (S2);
detecting a conflict by identifying a change in the state (S3) for the event (E) by an integration, and wherein the conflict occurs in an integration, when old state of the source entity is not same as the current state of the entity at target system, and wherein the conflict is detected by comparing the old state of the source entity with the current state of the target entity;
synchronizing the event (E) with state (S3) from the source system to the target system; and
detecting conflict by identifying change m state (S2) for event (E) by the integration.

4. The method of claim 1, wherein the step of recovering from the system failures comprises the steps of:
storing a time stamp of the source system and a step id that are last processed for each entity by the integration system for handling failures;
resuming the synchronization from an exact point of failure; and
allowing updating of further events whose time is greater than or equal to the time of source system and when a step id of the event is greater than 1.

5. The method of claim 1, wherein the step of recovering from the application failures comprises the steps of:
sending the event by source system pollers;
assigning a constant step number to each sub step in an update process;
getting a last updated time value from the target system for the entity that is updated;
updating the integration storage with the event and a respective last storage time;
checking fix changes done by the integration user after a last storage time for the event along with a time of changes, before initiating an update;
updating the time of changes in the integration storage, when the changes are found; and
creating/updating the entity in the integration storage, when the changes are not found.

6. The method as claimed in claim 1, wherein the method further comprises:
synchronizing preselected entities which qualifies a preset criteria;
assigning a flag to the preselected entities, when the preselected entities are updated after a time of first poll and the changes to the preselected entities are not synchronized to the target system in next time as the preselected quantities fail to satisfy the criteria due to updating; and
synchronizing the entities with flag-on condition.

* * * * *